Aug. 8, 1950     LA VERNE E. CLIFCORN ET AL     2,517,542
METHOD OF HEATING FOOD PRODUCTS IN SEALED CONTAINERS
Filed Nov. 18, 1946     4 Sheets-Sheet 1

Inventors
Gordon T. Peterson
John M. Boyd
Laverne E. Clifcorn
Mason, Porter, Diller,
and Stewart   Attorneys.

Aug. 8, 1950  LA VERNE E. CLIFCORN ET AL  2,517,542
METHOD OF HEATING FOOD PRODUCTS IN SEALED CONTAINERS
Filed Nov. 18, 1946  4 Sheets-Sheet 2

Aug. 8, 1950   LA VERNE E. CLIFCORN ET AL   2,517,542
METHOD OF HEATING FOOD PRODUCTS IN SEALED CONTAINERS
Filed Nov. 18, 1946                          4 Sheets-Sheet 4

Fig. 9.

Patented Aug. 8, 1950

2,517,542

UNITED STATES PATENT OFFICE 2,517,542

METHOD OF HEATING FOOD PRODUCTS IN SEALED CONTAINERS

La Verne E. Clifcorn, Gordon T. Peterson, and John M. Boyd, Chicago, Ill., assignors to Continental Can Company, Inc., New York, N. Y., a corporation of New York Application November 13, 1946, Serial No. 710,472

9 Claims. (Cl. 99—214)

The invention relates to new and useful improvements in the method of processing food products in sealed cans and more particularly food products which are liquid, semi-liquid or solids in liquid, such, for example, as soups, evaporated milk and fruits in syrup, or vegetables in brine, and also tightly packed solids having fluids in interstices of the mass, such as whole grain corn, peas, asparagus and the like.

The usual method of sterilizing food products sealed in metal cans, glass jars and the like is to subject the external surface of the container walls to a heating medium for transfer of heat to the food product and to a cooling medium for removing the heat therefrom. A suitable heating medium is steam and a suitable cooling medium is cold water.

The temperature and time necessary to destroy the spoilage organisms varies with the food product. Acid food products may be efficiently sterilized at relatively low temperatures and in a short interval of time. Common fruits and their juices and certain vegetables and their juices, such as red sour cherries, citrus juices, tomatoes and tomato juice whose pH values are below 4.5 are for the most part quite easily processed and in such instances, it is ordinarily necessary only to heat the sealed container long enough to attain temperatures at the center of the can of 200° F. or slightly less. For non-acid food products such as milk and common vegetables of a pH value above 4.5, temperatures of about 240° F.–250° F. are used for adequate heat processing within a practical time limit. Again the can must be subjected to the heat treating media for a time period to attain the required processing temperature at the center of the can. With these non-acid foods, the product must be maintained at the selected temperature for a time depending on the food product being treated in order to destroy all of the spoilage organisms. Increasing the temperature of the treating media will shorten the time necessary for rendering the food product sterile. However, when attempting to use high temperatures when the product in the can is not being agitated, considerable time will elapse before the center of the can will reach the higher temperature. During this time, the can contents nearest the can wall will be subjected to the higher temperature resulting in over cooking, loss of flavor, color and nutritive value of that portion of the product adjacent the interior wall of the can. This condition is accentuated as the size or diameter of the can is increased.

One of the important factors in processing food products in sealed cans is the time consumed to transfer heat from the walls of the can to the center thereof so that the entire food product will be uniformly heated to or near the temperature of the treating media. The quicker this can be accomplished, the better will be the quality and nutritive value of the food product. The same is true in the cooling of the product after heat treatment. Furthermore, any shortening of the time of heat transfer to and from the center of the can shortens the overall processing time and is of economical value, besides producing a better quality of processed food product.

It is therefore an object of the invention to provide a method of processing the food product in a sealed can which will permit the use of higher temperatures and pressures than are presently commercially feasible without injurious effects on the food product.

A further object of the present invention is to provide a method of bringing about movement of the mobile contents in the sealed can which will greatly shorten the time necessary for the transfer of heat to and from the center of the can and the overall time of processing.

A further object of the invention is to provide a method of bringing about movement of the mobile contents in a sealed can which will cause the mobile portion of the contents to move relative to the walls of the can thereby causing more or less turbulence in the can and thus greatly facilitate heat transfer from the walls of the can to and from the entire contents.

A further object of the invention is to provide a method of processing food products in cans wherein a space is provided permitting movement of the mobile contents, wherein the can is rotated in a manner setting up a centrifugal force tending to move the entire mass in the same general direction in the can and wherein the centrifugal force during each rotation of the can operates during a portion of the rotation to augment the force of gravity and during another portion of the rotation to oppose the action of gravity for causing movement of the mobile contents in the can.

A still further object of the invention is to provide a method of processing food products in cans wherein the can is rotated during the processing of the product therein so that the center of gravity of the can contents is constantly shifted, thus creating turbulence within the mobile contents.

A further object of the invention is to provide a method of processing food products in cans having head space wherein one or more cans are placed in a heat transfer medium and then revolved about a substantially horizontal axis located externally of the can, said axis being so placed with respect to the can that the desired processing time can be attained with a minimum number of can revolutions.

A further object of the invention is to provide a method of processing flowable food products in cans having a head space wherein the cans are placed in a heat transfer medium and then revolved about a substantially horizontal axis located externally of the can, said axis being so placed with respect to the can that the centrifugal force exerted on the contents at a selected speed of rotation will cause the head space during a portion of its path of movement to move across the can through the product, so that the desired processing time can be attained within a minimum period of time.

These and other objects will in part be obvious and will in part be hereinafter described.

Applicants' invention is directed particularly to a method of sterilization of food products by bringing about movement of the mobile contents in the sealed cans during the processing thereof. Before describing the method in detail, a brief reference will be made to some of the commercial methods of processing food products in metal cans.

It has been a very common practice to place the cans after they have been filled and sealed in baskets in a retort after which the retort is closed. Steam as a heating medium is directed into the retort under pressure so that a desired processing temperature may be obtained. The food product in the container is stationary and quite a long interval of time is necessary for the transfer of heat from the walls of the container to the center of the food product therein. The same is true when the product is cooled in the retort. It will be apparent that in such heat treatment of the food product, it is necessary to keep the processing temperatures within a range that will not result in over-cooking a portion of the can contents. A few examples will suffice to show the present commercial temperatures and time required to process a No. 2 can ($3\frac{7}{16}$" diameter × $4\frac{9}{16}$" high) containing the following products:

|  | Minutes |
|---|---|
| Whole kernel corn in brine, 240° F. | 50 |
| Spinach, 240° F. | 75 |
| Cabbage, 240° F. | 40 |

Another method of processing food products in sealed cans consists in passing the cans through valves into a retort in which there is a heating medium, preferably steam under pressure, at the desired processing temperature. The cans after entering the retort are rolled along a spiral path for a time sufficient to effect processing after which they pass out through a valve preferably into a similar retort for cooling. In the filling of the can with the food product, a head space is usually provided. In this continuous process just referred to where the can is rolled at about eleven revolutions per minute, there will be a movement of the food product over the inner cylindrical surface of the can and to some extent over the ends of the can. This results in movement of some of the food product over the heated surface and only slightly hastens the heat transfer to the center of the can. In actual practice with this type of agitation, the processing time is not materially reduced over non-agitating methods.

Figures 1, 2, 3, 4:
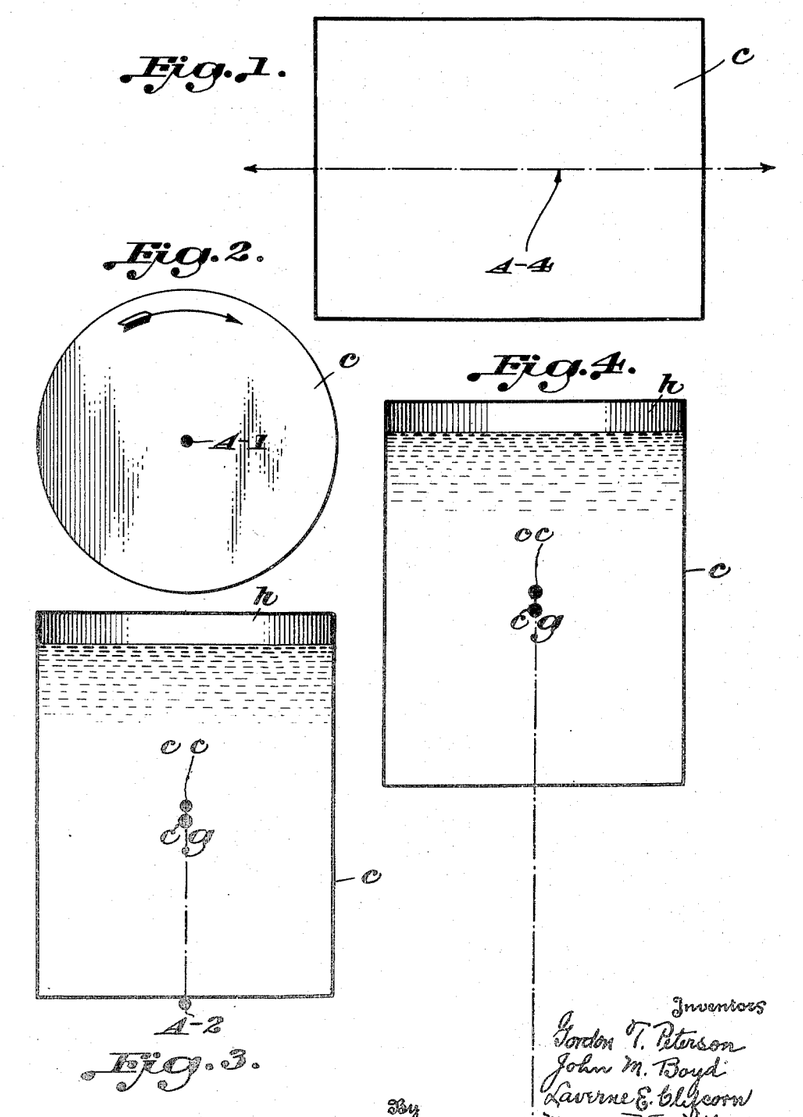
Figure 1 shows diagrammatically a sealed can reciprocated on a horizontal axis longitudinally of the can.
Figure 2 shows diagrammatically a sealed can rotated about a horizontal axis centrally of the can.
Figure 3 shows a sealed can revolved about a horizontal axis outside the can and at one end thereof.
Figure 4 shows a sealed can revolved about a horizontal axis a can length away from the can end.

Another method of processing food products in sealed cans consists in mounting the cans in a carriage so that the cans are reciprocated in a direction lengthwise of the can while it is substantially in a horizontal position, as shown, for example, in Figure 1, where the can is indicated at C and the axis of reciprocation at A—4. This will cause a movement of the food product against one end of the can and then against the other due to inertia and this aids in only a limited degree in the penetration of the heat to the center of the can unless the can is reciprocated at a very high speed.

It has also been proposed to rotate the can about its longitudinal axis as shown for example in Figure 2 of the drawings where the can is indicated at C and the axis of rotation at A—1. When the can is rotated about such an axis there is a certain amount of centrifugal force exerted on the food product, in addition to the force of gravity which assists in the agitation of the food product. However, the radius of rotation of the mass cannot exceed the radius of the can, and at low speeds of rotation, there is insufficient centrifugal force developed to cause the product near the center of the can to move radially outward. However, when the number of revolutions is increased, the resulting increase in centrifugal force will force the contents against the interior wall of the can which causes that portion of the contents near the can wall to move with the can wall so there is no relative motion between the two, resulting in over-cooking of this portion if temperatures are employed exceeding those now used in retort processing methods. When the can is slowly rotated the head space volume will be moved over the surface of the can, as it will remain at the upper side of the can until the speed is increased so the centrifugal force is sufficient to hold the contents of the can against the side wall thereby causing the head space volume to form at the center of the can.

Applicants have found that the most advantageous method of producing movement of the mobile contents in the metal can to facilitate processing of the food product resides in the mounting of the can for rotation about an axis which is outside of the can and so disposed that the can rotates in substantially a vertical plane. In Figure 3 of the drawing, the can is illustrated diagrammatically at C and the axis of rotation of the can is adjacent the end and is indicated at A—2. The head space in the can when the can is stationary is indicated at $h$. The center of the can is indicated at $c.c.$ and the center of gravity at $c.g.$ In Figure 4 of the drawings, the can is spaced away from its axis of rotation a can length. The axis is indicated at A—3. Like reference letters have been placed on this figure.

Figure 5:
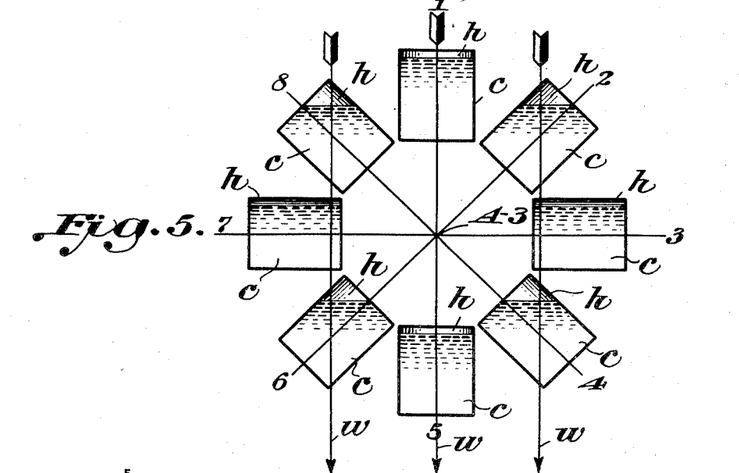
Figure 5 shows the level of the contents in a sealed filled can in eight different positions around a horizontal axis.

In Figure 5 there are shown diagrammatically eight different positions of the can as it moves about a horizontal axis A—3 which is a can length from the inner end of the can. The can is indicated at C, the head space at $h$ and the direction of the force of gravity by the arrows W. It is noted that the head space in position 1 is at the outer end of the can and in position 5 it is at the inner end of the can. During each revolution of the can, the head space shifts from one position to another, as clearly indicated in this figure.

Figure 6:
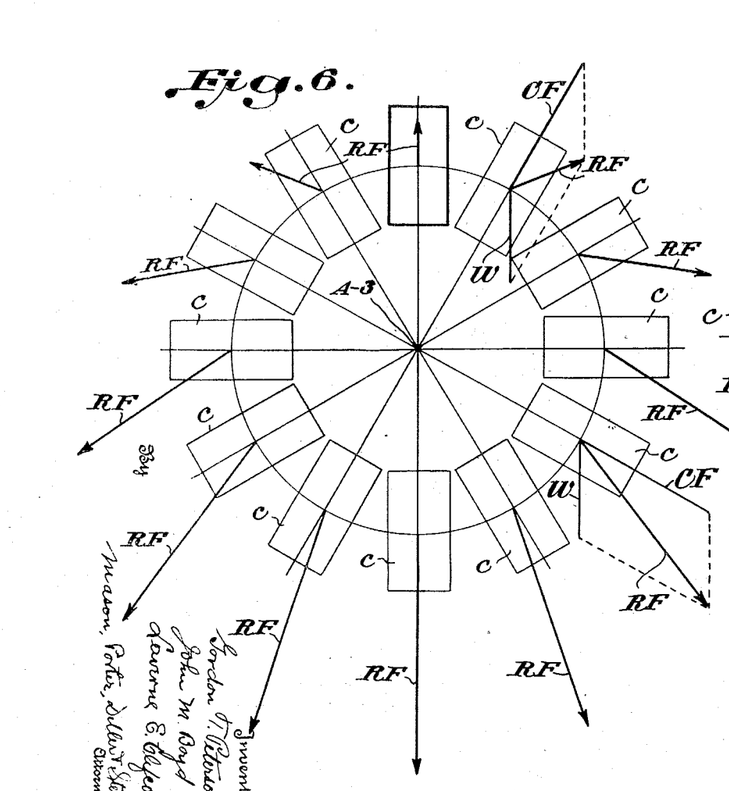
Figure 6 represents twelve positions of the can as it rotates about an axis one can length away from the can end and the direction and measure of the resultant force of gravity and centrifugal force at each position acting at the center of the mass when the centrifugal force equals one and one-half times the weight of the mass.
Figure 7:
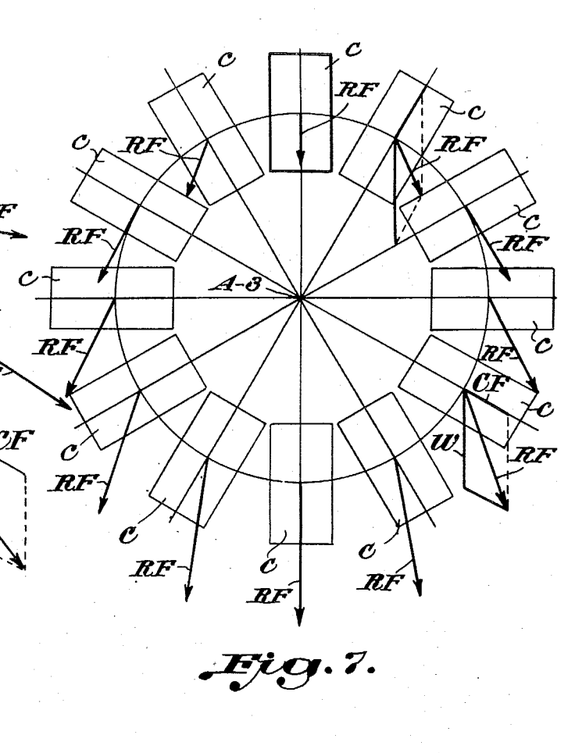
Figure 7 is a similar view when the centrifugal force equals one-half the weight of the mass.

When the can is rotated about this axis A—3 a centrifugal force will be exerted on the product in the can in a radial direction outward from said axis, whereas, the force of gravity will always be in a downward direction. This causes the angularity between the centrifugal force and the force of gravity to constantly change during rotation and thereby causes the resultant of these two forces to change in amount and angularity with respect to the can during each revolution. Figure 6 illustrates the direction and measure of this resultant force for twelve positions of the can when the centrifugal force being exerted at the center of gravity of the mass is equal to 1½ times the weight of the mass or contents. In this Figure 6 the can is indicated at C, the axis of rotation at A—3, and the resultant force at RF. In some of the positions there is also indicated the direction and extent of the centrifugal force by the line CF and the direction and extent of the force of gravity by the line W. Figure 7 is a similar illustration when the centrifugal force being exerted at the center of gravity of the mass is equal to ½ times the weight of the mass. This variation in the angularity and extent of the resultant force acting on the product at each revolution of the can causes turbulation in the fluid portion of the product.

As the rate of rotation is increased so is the turbulence increased until a condition is reached wherein the effect of centrifugal force causes the mobility of the product in the can to decrease or become more immobile with respect to the can.

In this combined effect of a decreasing mobility and an increasing rate of rotation there is a point of maximum rate of heat transfer beyond which the mobility of the product decreases to such an extent that the rate of heat transfer is reduced below the maximum rate.

At relative low speeds where the centrifugal force acting on the products is less than the force of gravity, the head space will move from a position adjacent the outer end of the can onto the side wall and along the side wall to the other end of the can and then along the opposite side wall and finally back to the outer end of the can during each revolution of the can, as illustrated in Figure 5. The can is rotated about its axis in a closed retort which is supplied with a heating media, preferably steam under pressure. This movement of the mobile contents causes the mobile portion of the product to contact and pass rapidly over the interior surface of the can resulting in a washing effect and a continuous removal of heat from the walls of the can to the contacting product and mixes it with the cool bulk of the product. This replacing of the heated film at the wall with the cooler product from the interior of the mass greatly shortens the time necessary to bring the product up to the approximate temperature of the external treating fluid. The same is true in the cooling on the product when the cans are subjected to a cooling media.

The movement of the mobile contents due to the action of the varying amount and direction of the resultant force on the product also greatly increases the turbulence in the can and thereby reduces the time necessary to bring about a transfer of the heat to all portions of the can contents so that the entire product will be heated to approximately the temperature of the heating medium external of the can.

Figure 9:
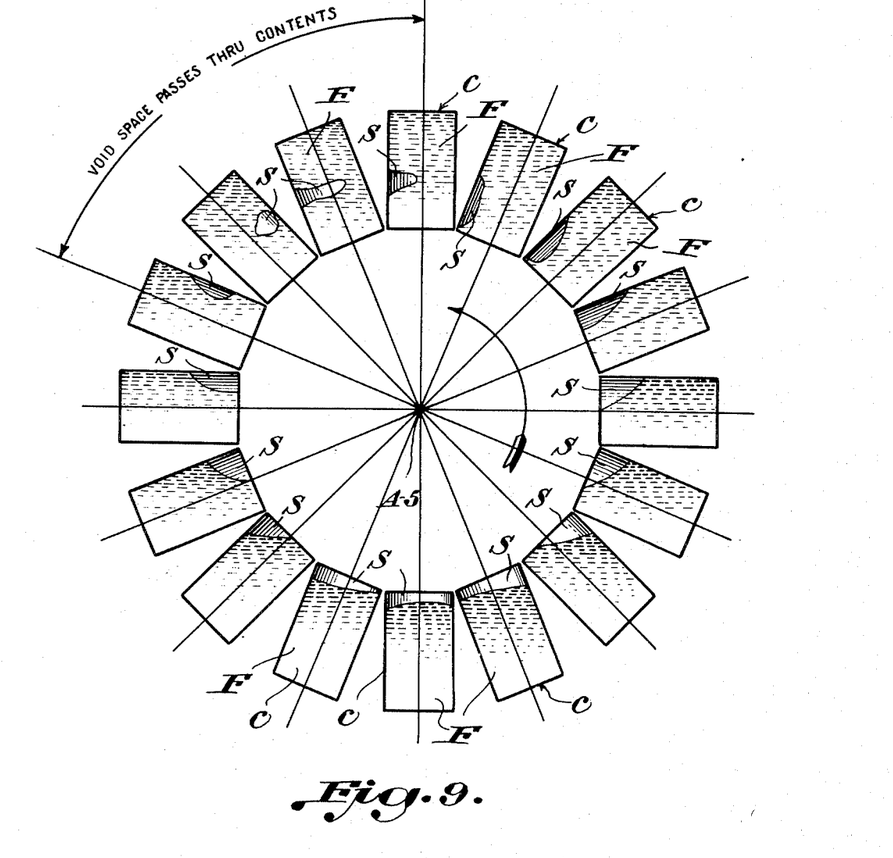
Figure 9 is a diagrammatic view showing a sealed can containing a liquid with a space provided for the movement of the mobile constituent. Sixteen positions are shown illustrating how the space changes its relation in reference to the walls of the can during each revolution thereof and showing the head space passing through the product.

When the can contents is a liquid or predominately a liquid containing a small percentage of solid product and the speed of rotation is increased until sufficient resultant force is exerted on the liquid farthest removed from the axis of rotation to retain a portion of the liquid against the farthest extremity of the can, the head space will follow a path transversely through the product near the top end of the can, then along the side of the can, then across the bottom of the can, then along the other side wall of the can during each rotation of the can. When the centrifugal force at the center of gravity of the mass equals approximately the weight of the mass, the head space will then pass through the central portion of the can, then along the side wall, the bottom and opposite wall, as above described and as clearly illustrated in Figure 9, wherein the can is indicated at C, the axis of rotation at A—5, the space at S and the flowable contents at F. The location and shape of the space shown in this figure was sketched from actual photographs made by a movie camera while the can was being rotated at a speed causing the space to transverse the central portion of the can. Thus the heat imparted to the head space from contact with the walls of the can is forced through the center of the can and thus quickly imparts heat thereto. At the same time the mobile portion of the product above and below the path of travel of the head space will be in a state of turbulence due to the shifting of the direction and degree of the resultant forces acting thereon. Thus the entire contents of the can is rapidly brought up to the desired temperature.

The same movement of the product and the same variation in the amount and direction of the resultant force acting on the product occur when the can is rotated about the axis A—2 which is adjacent the end of the can. In comparison with A—3, to obtain a minimum equivalent processing time, a higher speed of rotation is necessary to provide sufficient turbulence to produce the required movement of the product and head space because of the shorter radius of rotation. The same is true of all locations of the axis of rotation whether it be at one side of the end or at one side of the cylindrical body. To obtain the best advantages of centrifugal force acting on the product with a minimum number of revolutions the axis of rotation should be outside of the can.

Figure 8:
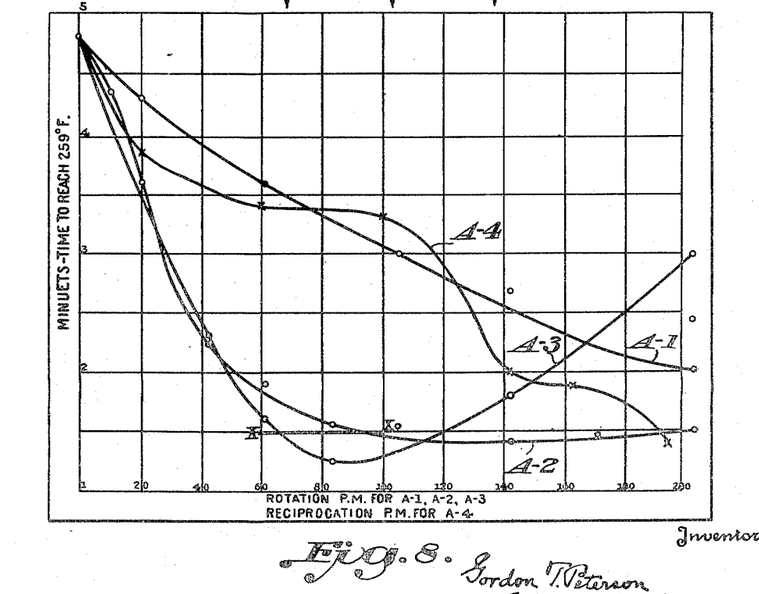
Figure 8 is a view showing graphs of the time necessary to raise the temperature of water at the center of a sealed can of a selected size from 60° F. to 259° F. at various rates of rotation and reciprocation and at various positions of the axis of rotation in relation to the can.

The graphs A—1, A—2 and A—3 shown in Figure 8 were made from data obtained by heating water from 60° F. to 259° F. in a heating media of approximately 260° F. A tin can having a diameter of 3" and a height of 3⅞" was filled with water so as to leave a head space of approximately ⅜" or 1/10 of the capacity of the can. The can was sealed and then placed in a retort and rotated therein. A thermo-couple was placed at the center of the can so as to determine the "come-up" time, that is, the time required for the contents at the center of the can to reach 259° F.

The can was first held stationary in the retort and the "come-up" time to 259° F. noted. Then the can was rotated at a selected speed and the time required to bring the temperature at the center of the can up to 259° F. noted. The data was secured on a number of different selected speeds of rotation and from this data the graphs were plotted.

A can was rotated about an axis A—1 such as shown in Figure 1 and the graph A—1 was made from data obtained by the rotating of the can at different speeds and noting the time required to bring the product at the center of the can up to 259° F. The can was then placed with the axis of rotation adjacent the end of the can and like data obtained from which the graph A—2 was plotted. The can was then placed a can length away from its axis of rotation and data obtained from which graph A—3 was plotted. The graph A—4 shown in Figure 8 was made from data obtained by reciprocating the can in the retort under the conditions stated above and in the manner described in connection with Figure 1. The can was first held stationary and the come-up time required to bring the contents at the center of the can up to 259° F. was noted. It was then reciprocated, that is, moved back and forth a distance of one inch a selected number of times, and again the come-up time noted. Thus the data was obtained for reciprocating the can and the graph A—4 was plotted. The following table shows the comparisons:

*Come-up time*

| R. P. M. | A-1 | A-2 | A-3 | Reciprocation Per Minute | A-4 |
|---|---|---|---|---|---|
| 0 | 4.8 | 4.8 | 4.8 | 0 | 4.8 |
| 10 |  | 4.35 | 4.3 |  |  |
| 20 | 4.3 | 3.6 | 3.4 | 19 | 3.8 |
| 42 |  | 2.25 | 2.3 |  |  |
| 60½ | 3.6 | 1.9 | 1.6 | 60 | 3.4 |
| 83 |  | 1.55 | 1.25 |  |  |
| 105 | 3.0 | 1.52 | 1.4 | 100 | 3.3 |
| 142 | 2.7 | 1.40 | 1.8 | 141 | 2.0 |
|  |  |  |  | 163 | 1.8 |
| 204 | 2.0 | 1.50 | 3.0 | 194 | 1.4 |

From a comparison of the graphs in Figure 8 it will be noted that the come-up time is much shorter when the axis of rotation is outside of the can as at A—2 or at A—3 than when the axis of rotation is at the center of the can as at A—1. It will also be noted from the graph A—4 in which the can was reciprocated that the come-up time is not reduced to the same degree as when the can is rotated about axes A—2 or A—3 until the reciprocations reach nearly 200 per minute.

In the A—3 type of rotation, the can is spaced one can length from its axis of rotation. By spacing the bottom of the can a short distance away such as a few inches or more away from its axis of rotation, the contents can be heated to a selected temperature with fewer revolutions than is the case when the can is placed closer to the axis of rotation. This can be seen by reference to line x—x on Figure 8 drawn through the curve at 1.5 minutes. It intersects curves A—3 and A—2 at 65 and 92 R. P. M. respectively. By proper spacing of the can from its center of rotation, the number of revolutions may be kept at a minimum and still attain the same come-up time. This is a decided advantage in the design and construction of a practical unit to practice this method because the speed of the revolving mass and the centrifugal force can be kept within practical limits, and the problem of proper strength of material and rotary balance is greatly simplified.

The times necessary for sterilizing and the temperature used when employing applicants' method in comparison with the conventional sterilizing of some food products is shown in the following table.

| Can Size | Product | Type of Agitation | R. P. M. | Temp. °F. | Time in Minutes |
|---|---|---|---|---|---|
| 3" dia. x 3⅞" high | Evaporated Milk | Cans Rolled | 11 | 240 | 18 |
| 3" dia. x 3⅞" high | ...do... | Rotated A-2 | 105 | 260 | 2.25 |
| 3 3/16" dia. x 4 9/16" high | Whole Kernel Corn in Brine | Stationary | None | 240 | 50 |
| 3 3/16" dia. x 4 9/16" high | Whole Kernel Corn, Brine Packed | ...do... | None | 245 | 35 |
| 3 3/16" dia. x 4 9/16" high | ...do... | ...do... | None | 250 | 25 |
| 3 3/16" dia. x 4 9/16" high | ...do... | ...do... | None | 260 | 10.5 |
| 3 3/16" dia. x 4 9/16" high | ...do... | Rotated A-2 | 105 | 260 | 5.2 |
| 6 3/16" dia. x 7" high | Whole Kernel Corn in Brine | Stationary | None | 240 | 80 |
| 6 3/16" dia. x 7" high | Whole Kernel Corn in Brine Split Cook. | {Shaken / Stationary} | None / None | 250 / 240 | 15 / 30 |
| Total |  |  |  |  | 45 |
| 6 3/16" dia. x 7" high | Whole Kernel Corn in Brine | Rotated A-2 | 42 | 260 | 10 |
| 3 3/16" dia. x 4 9/16" high | Spinach | Stationary | None | 252 | 45 |
| 3 3/16" dia. x 4 9/16" high | ...do... | ...do... | None | 260 | 24.25 |
| 3 3/16" dia. x 4 9/16" high | ...do... | Rotated A-2 | 60½ | 260 | 12 |
| 3 3/16" dia. x 4 9/16" high | Asparagus Spears | Stationary | None | 240 | 26 |
| 3 3/16" dia. x 4 9/16" high | ...do... | ...do... | None | 248 | 16 |
| 3 3/16" dia. x 4 9/16" high | ...do... | Rotated A-2 | 60½ | 270 | 4.5 |
| 3 3/16" dia. x 4 9/16" high | Cabbage | Stationary | None | 240 | 40 |
| 3 3/16" dia. x 4 9/16" high | ...do... | Rotated A-2 | 60½ | 270 | 2.75 |

The benefits which may be derived from applicants' method of agitation may be summarized as follows:

(1) More rapid heating of the contents of the can which shortens the time required to sterilize the contents;

(2) Prevention of overcooking or scorching the product near the surface of the can as there is a continuous change of the product position; this in turn permits the use of higher temperatures in the heat transfer media, thereby further shortening the time required for sterilization;

(3) Better flavor, color and nutritive value and with some products, better texture resulting from the shorter time required for sterilization;

(4) Less sulfide staining of the can; since the cooking is shorter there is less sulfo protein breakdown in high-protein products, consequently there are less sulfide products produced; and (5) Increased production rates resulting from the use of short process times.

(6) There is an increase of the retained vitamin content when food is heated and cooled quickly by this process. By actual test, the following results were obtained can be withdrawn from the retort and by employing controlled air pressure on the retort at the instant the heating medium is withdrawn and injecting a cooling medium such as water placed therein or sprayed therein during the continued rotation of the can, the time necessary for the removal of heat from the entire contents of the can is greatly shortened. Thus the differential in pressure between the inside and outside of the can may be maintained below the critical buckling pressure thereby enabling the use of lighter gauge tin plate for can ends.

While the graphs produced were obtained by heating water in a turning can, the same results are obtainable with food products which are liquid, semi-liquid, or solids with liquid. While a can of three-inch diameter was used, likewise substantially the same results are obtainable with large size cans such as gallon cans used by hotels, institutions and the like. In fact, large cans can be successfully processed by applicants' method in a rapid manner where it is impossible to accomplish the result by the conventional

| Product | Type of Agitation | R. P. M. | Temp. | Time in Minutes | Thiamine Content mg./100 gm. |
|---|---|---|---|---|---|
| | | | °F. | | |
| Vacuum Packed Whole Kernel Corn | Rotated A-2 | 42 | 260 | 5 | .082 |
| Do | Stationary | None | 250 | 35 | .034 |
| Brine Packed Whole Kernel Corn | Rotated A-2 | 105 | 260 | 6 | .061 |
| Do | Stationary | None | 240 | 40 | .025 |
| Brine Packed Peas | Rotated A-2 | 105 | 270 | 5 | .204 |
| Do | None | None | 240 | 35 | .156 |

By applicants' method, it is possible that a lighter gauge metal may be used in the making of the can without fear of the can walls collapsing under the processing pressure, or the ends buckling between the process and cooling operations.

In order to obtain high temperatures when steam is used as the heating medium, steam under pressure is necessary and when the walls of the can are subjected to high external pressure for a considerable length of time before the pressure in the can is brought into balance with the external pressures, the side walls of the can may panel or collapse due to this difference in pressure.

By applicants' method, the come-up time of the can contents follows closely the come-up time of the retort. Therefore, the pressure differential between the interior and the exterior of the can is materially reduced, and the can is maintained under high pressure steam for shorter periods of time, thereby reducing the tendency of paneling the can bodies. This feature makes it possible to use lighter gauge metal without fear of the can walls paneling or collapsing under processing pressure.

High internal can pressures developed during processing may cause the can ends to bulge and become permanently distorted or buckled if the external pressure during cooling is reduced too quickly causing extreme differential of pressure between the inside and outside of the can body.

By applicants' method, the heating medium methods used for processing.

While the invention has been described in detail as applied to the processing of food products whether liquid, semi-liquid or solids in liquid with a normal head space, the invention may also be applied to the processing of food products such as whole grain corn or the like which are packed in sealed cans in vacuum with a comparatively small amount of liquid. In such cases, it is the usual practice to fill the can full of the solid particles. There are interstices throughout the entire whole grain corn product and these spaces permit movement of the liquid and the vapors produced therefrom during heating throughout the whole product when the can is subjected to the processing method above described. The liquid will be brought into contact with the walls of the can and move with great speed and turbulence throughout the entire product, greatly facilitating the heat transfer from the walls of the can to the center of the contents. The present commercial method of sterilizing the whole grain corn, vacuum packed, is to place the same in baskets and then place the baskets in a closed retort. Steam as a heating medium is directed into the retort under pressure so that the desired processing temperature may be obtained. The times necessary for sterilizing and the temperature used when employing applicants' method for processing whole grain corn, vacuum packed, in comparison with the conventional sterilization of the same is shown in the following table:

| Can Size | Product | Type of Agitation | R. P. M. | Temp. | Time in Minutes |
|---|---|---|---|---|---|
| | | | | °F. | |
| 3 7/16" dia. x 3 3/8" high | Whole Kernel Corn Vacuum packed | Stationary | None | 240 | 55 |
| 3 7/16" dia. x 3 3/8" high | do | do | None | 245 | 45 |
| 3 7/16" dia. x 3 3/8" high | do | do | None | 250 | 35 |
| 3 7/16" dia. x 3 3/8" high | do | do | None | 260 | 21 |
| 3 7/16" dia. x 3 3/8" high | do | Rotated A-2 | 42 | 260 | 4.2 |

The method of bringing about movement of the product in the can described above may be applied to cans of various shapes, design and material, but is particularly well adapted to the round tin can.

It is obvious that any other heating medium may be used instead of steam in the carrying out of the improved method.

We claim:

1. The method of processing food products in sealed cans containing at least one liquid constituent wherein there is provided a gaseous space permitting movement of the mobile contents of the can, which comprises rapidly rotating the cans end over end in a heating medium about a substantially horizontal axis located externally of the cans and at a speed wherein the centrifugal force and weight exerted by the contents will cause said gaseous space to move along a portion of the walls of the cans and then across the cans substantially at the center thereof during each rotation of the cans, thereby causing turbulence and rapid circulation of the mobile contents, thus facilitating the heat transfer to the center of the cans and continuing said rotations for a time at least sufficient to destroy all spoilage organisms in the contents of the cans.

2. The method of processing food products in sealed cans containing at least one liquid constituent wherein there is provided a gaseous space permitting movement of the mobile contents of the cans which comprises rapidly rotating the cans end over end in a heating medium about a substantially horizontal axis externally of the cans for a time at least sufficient to destroy all spoilage organisms in the contents of the cans and then rapidly rotating the cans end over end in a cooling medium about a substantially horizontal axis externally of the cans for a time sufficient to cool the contents of the cans, the speed of rotation during the transfer of heat to or from the contents of the cans being such that centrifugal force and weight exerted by the contents will cause said gaseous space to move along a portion of the walls of the cans and then across the cans substantially at the center thereof during each rotation of the cans, thereby causing turbulence and rapid circulation of the mobile contents thus facilitating the heat transfer to or from the center of the contents.

3. The method of processing food products in sealed cans containing at least one liquid constituent, wherein there is provided a gaseous space permitting the movement of the mobile contents of the cans which comprises rapidly rotating the cans end over end in a cooling medium about a substantially horizontal axis located externally of the cans and at a speed wherein the centrifugal force and weight exerted by the contents will cause said gaseous space to move along a portion of the walls of the cans and then across the cans substantially at the center thereof during each rotation of the cans, thereby causing turbulence and rapid circulation of the mobile contents, thus facilitating the heat transfer from the center of the can and continuing said rotation for a time sufficient to quickly cool the contents of the cans.

4. The method of processing liquid products in sealed cans wherein there is provided a gaseous space permitting movement of the contents of the cans comprising rapidly rotating the cans end over end in a heating medium about a substantially horizontal axis externally of the cans and at a speed which will result in a centrifugal force on the product at the center of gravity of the product, lying within the range of from one-half to one and one-half times the weight of the product so that the resultant of said force and gravity acting at the center of gravity of the product will progressively and rapidly vary in amount and in direction for each rotation of the cans and thereby causing turbulence and rapid circulation of the liquid product and thus accelerate the heat transfer to the contents of the cans and continuing said rotation for a time at least sufficient to destroy all spoilage organisms in the contents of the cans.

5. The method of processing liquid products in sealed cans wherein there is provided a gaseous space permitting movement of the contents of the cans comprising rapidly rotating the cans end over end in a heating medium about a substantially horizontal axis externally of the cans for a time at least sufficient to destroy all spoilage organisms in the contents of the cans and then rapidly rotating the cans end over end in a cooling medium about a substantially horizontal axis externally of the cans for a time sufficient to cool the contents of the cans, the speed of rotation during the transfer of heat to or from the contents of the cans being such as to cause a centrifugal force on the product at the center of gravity of the product lying within the range of from one-half to one and one-half times the weight of the product so that the resultant of said force and gravity acting at the center of gravity of the product will progressively and rapidly vary in amount and in direction for each rotation of the cans thereby causing turbulence and rapid circulation of the liquid product and thus accelerating the heat transfer to or from the contents of the cans.

6. The method of processing a liquid product in sealed cans wherein there is provided a gaseous space permitting movement of the contents of the cans comprising rapidly rotating the cans end over end in a cooling medium about a substantially horizontal axis externally of the cans and at a speed which will result in a centrifugal force on the product at the center of gravity of the product lying within the range of from one-half to one and one-half times the weight of the product so that the resultant of said force and gravity acting at the center of gravity of the product will progressively and rapidly vary in amount and direction for each rotation of the cans thereby causing turbulence and rapid circulation of the liquid product and thus accelerating heat transfer from the contents of the cans.

7. The method of processing food products in sealed cans containing at least one liquid constituent wherein there is provided a gaseous space permitting movement of the mobile contents of the cans which comprises placing the cans in the heating medium maintained at a temperature of substantially 260° F. and rapidly rotating the cans end over end about a substantially horizontal axis located externally of the cans for causing the contents to exert a centrifugal force so that the resultant of said force and gravity acting against the center of gravity of the product will progressively vary in amount and in direction during each rotation of the cans and at a speed which will cause such resultant forces to create turbulence and rapid circulation of the mobile constituents for accelerating heat transfer to the contents of the cans and thereby quickly raising the temperature of the entire contents to substantially that of the heating medium.

8. The method of processing food products in sealed cans containing at least one liquid constituent wherein there is provided a gaseous space permitting movement of the mobile contents of the cans which comprises placing the cans in the heating medium maintained at a temperature of substantially 260° F. and rapidly rotating the cans end over end about a substantially horizontal axis located externally of the cans and at a speed wherein the centrifugal force and weight exerted by the contents will cause said gaseous space to move along a portion of the walls of the cans and then across the cans substantially at the center thereof during each rotation of the cans, thereby causing turbulence and rapid circulation of the mobile contents for accelerating heat transfer to the contents of the cans and thereby quickly raising the temperature of the entire contents to that of the heating medium and continuing said rotation for a time at least sufficient to destroy all spoilage organisms in the contents of the cans.

9. The method of processing food products in sealed cans containing at least one liquid constituent wherein there is provided a gaseous space permitting movement of the mobile contents of the cans which comprises placing the cans in the heating medium maintained at a temperature of substantially 260° F. and rapidly rotating the cans end over end about a substantially horizontal axis located externally of the cans and at a speed which will result in a centrifugal force on the product at the center of gravity of the product, lying within the range of from one-half to one and one-half times the weight of the product so that the resultant of said force and gravity acting at the center of gravity of the product will progressively and rapidly vary in amount and in direction for each rotation of the cans thereby causing turbulence and rapid circulation of the mobile constituents for accelerating heat transfer to the contents of the cans and thereby quickly raising the temperature of the entire contents to substantially that of the heating medium and continuing said rotations for a time at least sufficient to destroy all spoilage organisms in the contents of the cans.

LA VERNE E. CLIFCORN.
GORDON T. PETERSON.
JOHN M. BOYD.

REFERENCES CITED

The following references are of record in the file of this patent:

UNITED STATES PATENTS

| Number | Name | Date |
| --- | --- | --- |
| 1,227,101 | Wehmiller | May 22, 1917 |
| 1,391,953 | Hansen | Sept. 27, 1921 |
| 1,584,397 | Paxton | May 11, 1926 |
| 2,372,239 | Whitaker et al. | Mar. 27, 1945 |
| 2,388,103 | Whitaker et al. | Oct. 30, 1945 |

FOREIGN PATENTS

| Number | Country | Date |
| --- | --- | --- |
| 42,035 | Netherlands | Nov. 15, 1937 |